(12) United States Patent
Karst

(10) Patent No.: US 11,903,337 B2
(45) Date of Patent: Feb. 20, 2024

(54) TILT SYSTEM FIELD LEARNING AND OPTIMIZATION FOR A WORK VEHICLE

(71) Applicant: DEERE & COMPANY, Moline, IL (US)

(72) Inventor: Austin J. Karst, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 590 days.

(21) Appl. No.: 17/008,306

(22) Filed: Aug. 31, 2020

(65) Prior Publication Data
US 2022/0061213 A1 Mar. 3, 2022

(51) Int. Cl.
| | |
|---|---|
| A01D 34/28 | (2006.01) |
| A01D 75/18 | (2006.01) |
| A01D 34/24 | (2006.01) |
| A01D 34/00 | (2006.01) |

(52) U.S. Cl.
CPC ......... *A01D 34/283* (2013.01); *A01D 34/006* (2013.01); *A01D 34/246* (2013.01); *A01D 75/185* (2013.01)

(58) Field of Classification Search
CPC .. A01D 34/283; A01D 34/006; A01D 34/246; A01D 75/185; A01D 79/005; A01D 41/145
See application file for complete search history.

(56) References Cited

U.S. PATENT DOCUMENTS

| | | | |
|---|---|---|---|
| 8,863,484 B2 | 10/2014 | Patterson et al. | |
| 2001/0016788 A1 | 8/2001 | Hauwiller et al. | |
| 2016/0360697 A1* | 12/2016 | Diaz | B60W 50/085 |
| 2018/0042173 A1 | 2/2018 | Henson | |
| 2018/0042176 A1* | 2/2018 | Obropta | G06T 7/55 |
| 2018/0047177 A1* | 2/2018 | Obropta | G06T 17/20 |
| 2019/0041973 A1* | 2/2019 | Maheshwari | H04L 12/2803 |
| 2019/0327893 A1 | 10/2019 | Hamilton et al. | |
| 2020/0337240 A1 | 10/2020 | Brimeyer et al. | |
| 2022/0061218 A1* | 3/2022 | Karst | A01D 75/285 |

* cited by examiner

*Primary Examiner* — Russell Frejd
(74) *Attorney, Agent, or Firm* — Michael Best & Friedrich LLP

(57) ABSTRACT

A work vehicle includes a chassis, and a work implement movably coupled to the chassis and configured to perform a field-engaging function. The work machine also includes an actuator coupled to the work implement and configured to adjust a position of the work implement relative to a ground surface. The work machine further includes a controller in communication with an output device and a communication module. The controller is configured to monitor a location of the work machine via the communication module. The controller is also configured to load a field map from a field map database, the field map identifying at least one impact event comprising a geotagged location. The controller is further configured to display an alert via the output device in response to the location of the work machine approaching within a predetermined distance from the geotagged location.

19 Claims, 15 Drawing Sheets

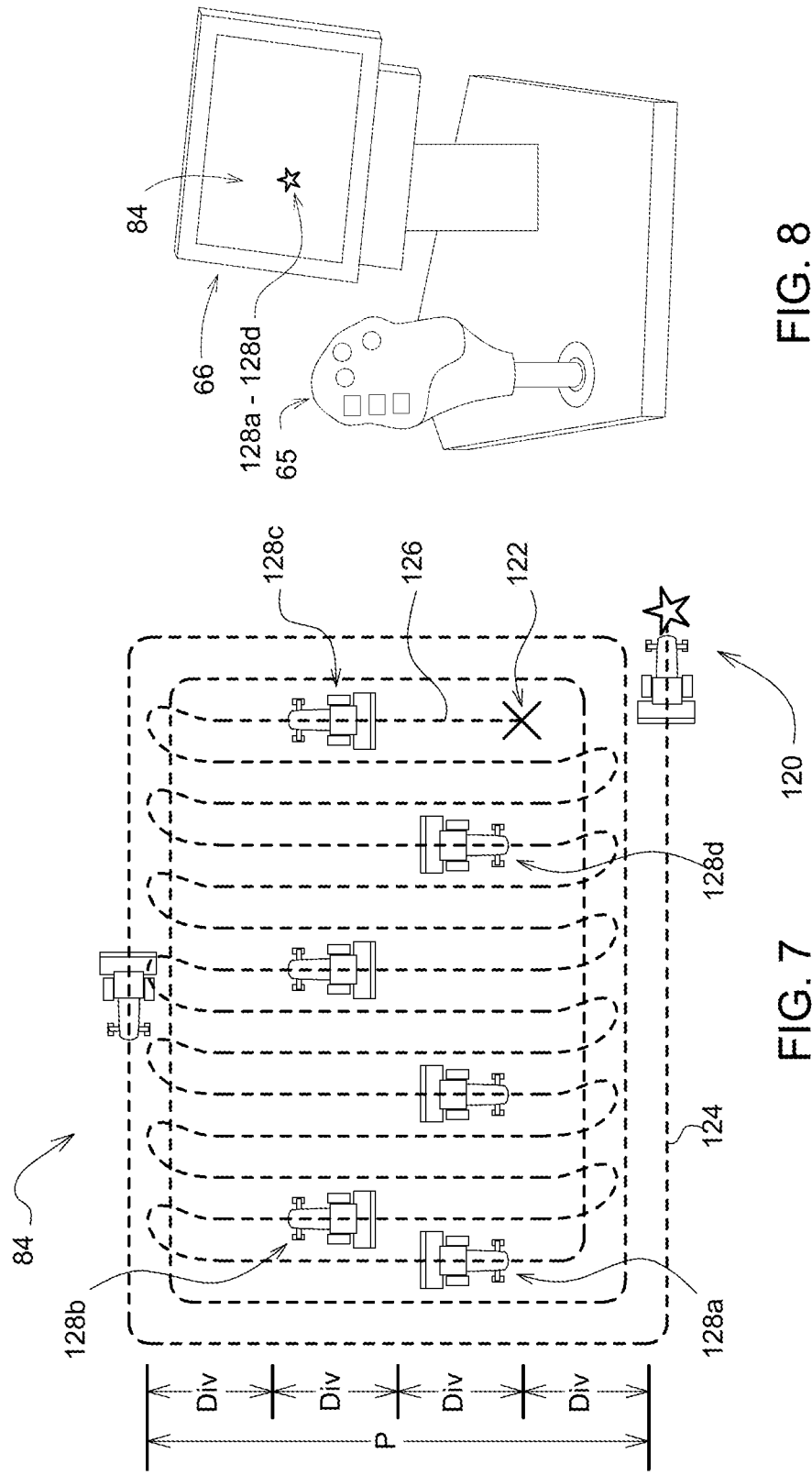

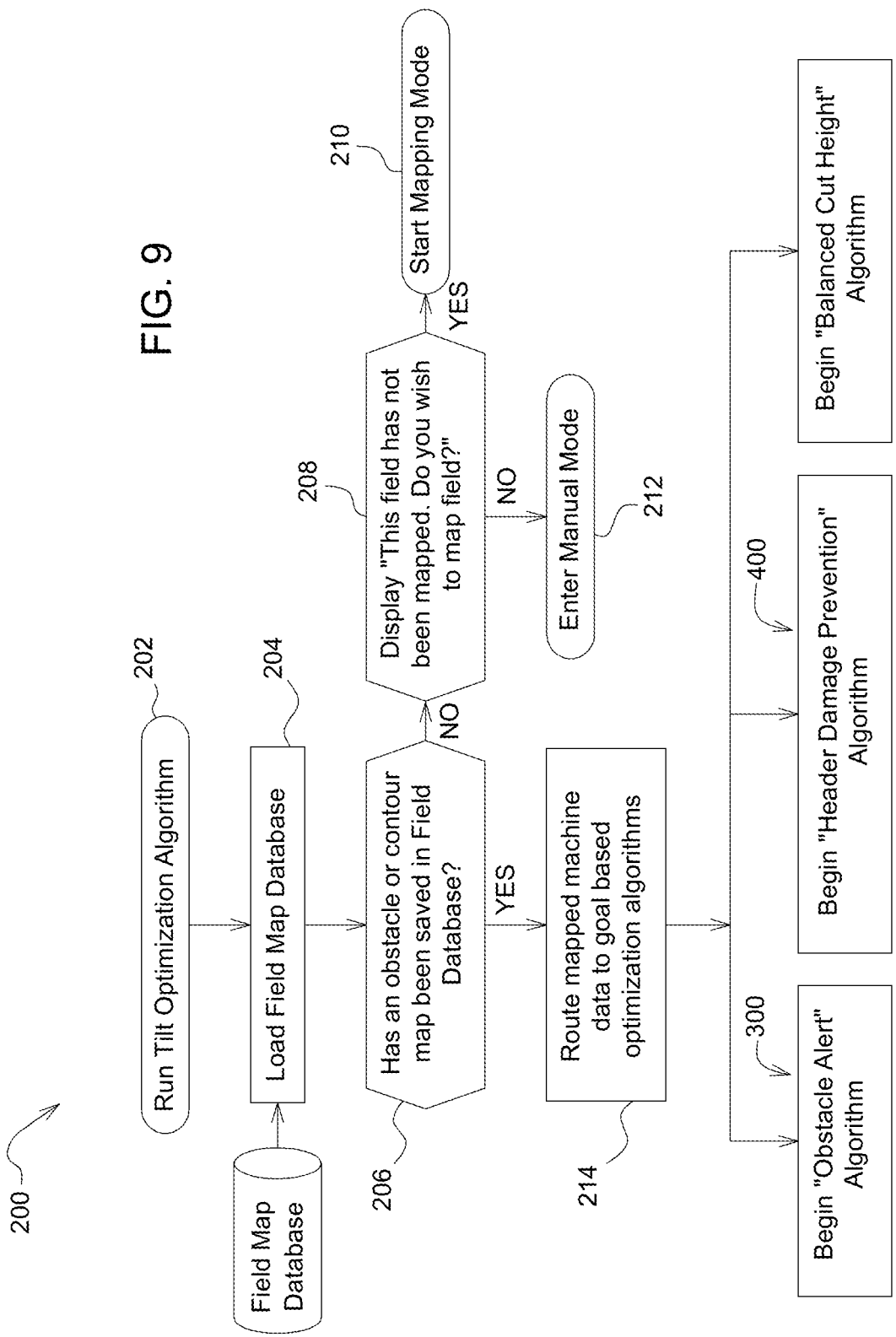

TILT SYSTEM FIELD LEARNING AND OPTIMIZATION FOR A WORK VEHICLE

FIELD

The present disclosure relates to a work implement adjustment system for a work vehicle.

BACKGROUND

Many industrial work machines, such as farming equipment, use hydraulics to control various moveable implements. The operator is provided with one or more input or control devices operably coupled to one or more hydraulic actuators, which manipulate the relative location of select components or devices of the equipment to perform various operations. For example, windrowers may be utilized in cutting crops. A windrower may include a header attachment pivotally coupled to a chassis. One or more hydraulic cylinders are coupled to the header attachment and move the header attachment between positions relative to the chassis.

SUMMARY

In one embodiment, the disclosure provides a work vehicle that includes a chassis, and a work implement movably coupled to the chassis, the work implement configured to perform a field-engaging function. The work machine also includes an actuator coupled to the work implement and configured to adjust a position of the work implement relative to a ground surface. The work machine further includes a controller in communication with an output device and a communication module. The controller is configured to monitor a location of the work machine via the communication module. The controller is also configured to load a field map from a field map database, the field map identifying at least one impact event comprising a geotagged location. The controller is further configured to display an alert via the output device in response to the location of the work machine approaching within a predetermined distance from the geotagged location.

In another embodiment, the disclosure provides a work machine that includes a chassis, and a work implement movably coupled to the chassis, the work implement configured to perform a field-engaging function. The work machine also includes an actuator coupled to the work implement and configured to adjust a position of the work implement relative to a ground surface. The work machine further includes a controller in communication with a communication module. The controller is configured to monitor a location of the work machine via the communication module. The controller is also configured to load a field map from a field map database, the field map identifying at least one impact event that comprises a geotagged location and a characteristic of the actuator associated with the geotagged location. The controller is further configured to determine whether the characteristic of the actuator exceeds a predetermined value. The controller is also configured to, in response to the characteristic of the actuator exceeding the predetermined value, create an adjustment event to adjust the position of the work implement via the actuator in response to the location of the work machine approaching within a predetermined distance from the geotagged location.

In another embodiment, the disclosure provides a work machine that includes a chassis, and a work implement movably coupled to the chassis, the work implement configured to perform a field-engaging function. The work machine also includes an actuator coupled to the work implement and configured to adjust a position of the work implement relative to a ground surface. The work machine further includes a controller in communication with a communication module. The controller is configured to monitor a location of the work machine via the communication module. The controller is also configured to load a field map from a field map database, the field map identifying spatial information about a corresponding field and a characteristic of the actuator associated with the spatial information. The controller is further configured to separate the spatial information into at least one pass traversable by the work machine in the field, and separate the at least one pass into at least one division. The controller is also configured to determine whether the characteristic of the actuator for the at least one division exceeds a predetermined value. The controller is further configured to, in response to the characteristic of the actuator for the at least one division exceeding the predetermined value, create an adjustment event to adjust the position of the work implement via the actuator in response to the location of the work machine moving within the division.

Other aspects of the disclosure will become apparent by consideration of the detailed description and accompanying drawings.

BRIEF DESCRIPTION OF THE DRAWINGS

FIG. 7 is a schematic of an exemplary field map generated by the obstacle detection and field mapping module.

FIG. 8 is a perspective view of a control screen and various operator input mechanisms of the windrower of FIG. 1.

FIGS. 9-16 are flow charts of a field learning and optimization module for the control system.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
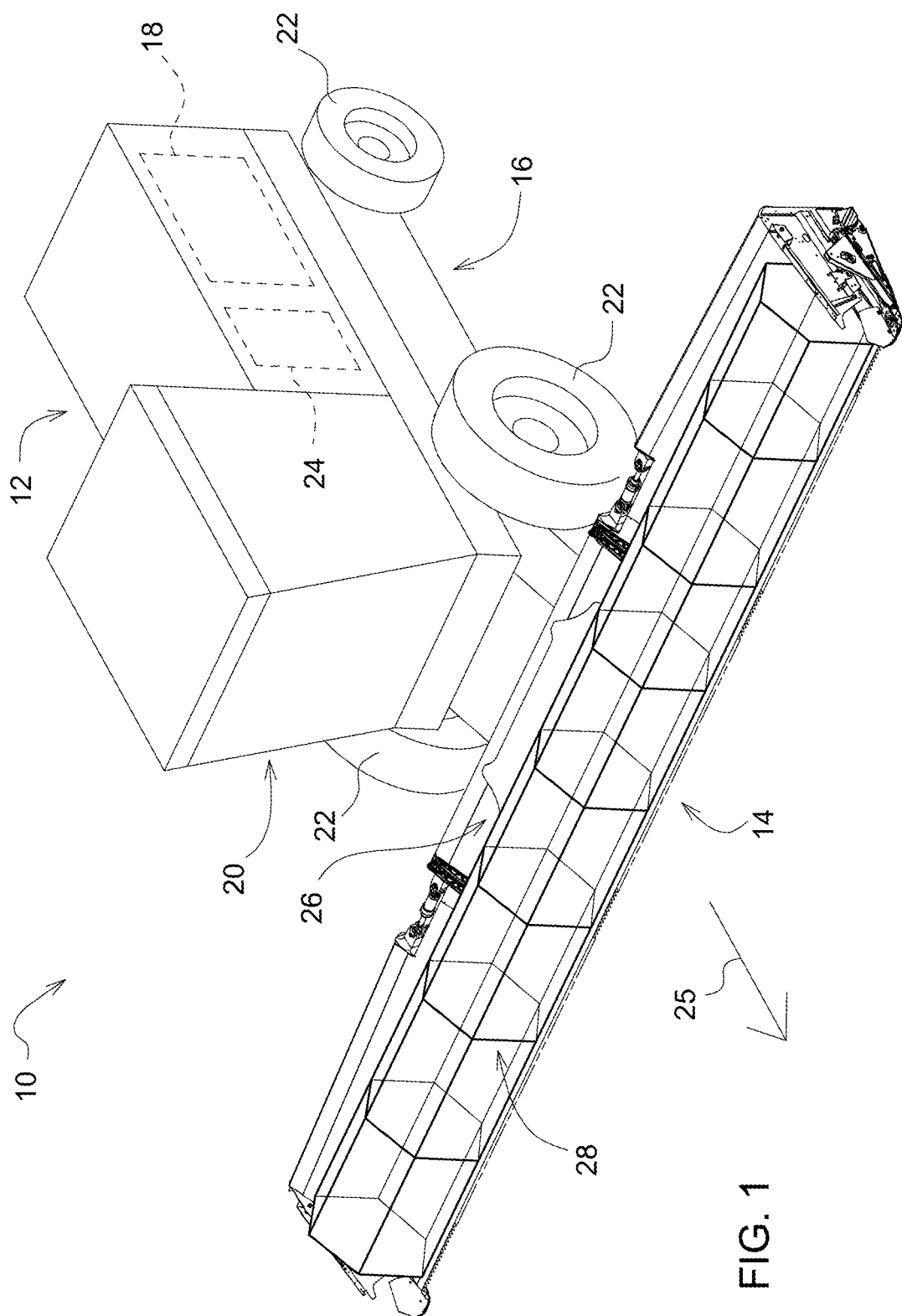
FIG. 1 is a perspective view of a windrower.

FIG. 1 illustrates an embodiment of a work machine depicted as a self-propelled windrower 10. The present disclosure is not limited, however, to a windrower and may extend to other industrial machines such as, e.g., a combine harvester, or any other work machine. As such, while the figures and forthcoming description may relate to a windrower, it is to be understood that the scope of the present disclosure extends beyond a windrower and, where applicable, the term "machine" or "work machine" will be used instead. The term "machine" or "work machine" is intended to be broader and encompass other vehicles besides a windrower for purposes of this disclosure.

The illustrated windrower 10 includes a tractor 12 and a work implement such as a header 14 coupled to the tractor 12. The header 14 is configured to perform a field-engaging function in a field. For example, in some embodiments, the header 14 may be configured to cut crops in a field (e.g., hay, small grain crops, etc.). In other embodiments, the work implement may be configured to gather crops that are already cut, to till the field, to plant seeds in the field, and the like. In such embodiments, the work implement may comprise a header for a cotton harvester, a combine, a forage harvester, a sugar cane harvester, and the like. The work implement may also comprise a feed system for a bailer, or seeding or tillage equipment. The systems and methods for field learning and optimization described herein with regard to the header 14 of the windrower 10 are likewise applicable to these and other work implements.

The tractor 12 includes a chassis 16, a prime mover 18, an operator cab 20, a plurality of ground-engaging devices 22, and a control system 24. The prime mover 18 is configured to move the tractor 12 in a direction of travel 25 via the ground engaging devices 22. The illustrated ground-engaging devices 22 are wheels, but tracks or other suitable ground-engaging devices can be utilized. The chassis 16 supports the prime mover 18 and the control system 24. The prime mover 18 can include an engine, such as a diesel engine, and the control system 24 can include a vehicle control unit (VCU).

A vehicle operation system (not shown) is positioned in the cab 20 and can include different combinations of a steering wheel, control levers, joysticks, control pedals, control buttons, control displays, and other input devices. The operator can actuate one or more controls of the vehicle operation system for purposes of operating movement of the windrower 10 and the different components of the header 14.

Figure 2:
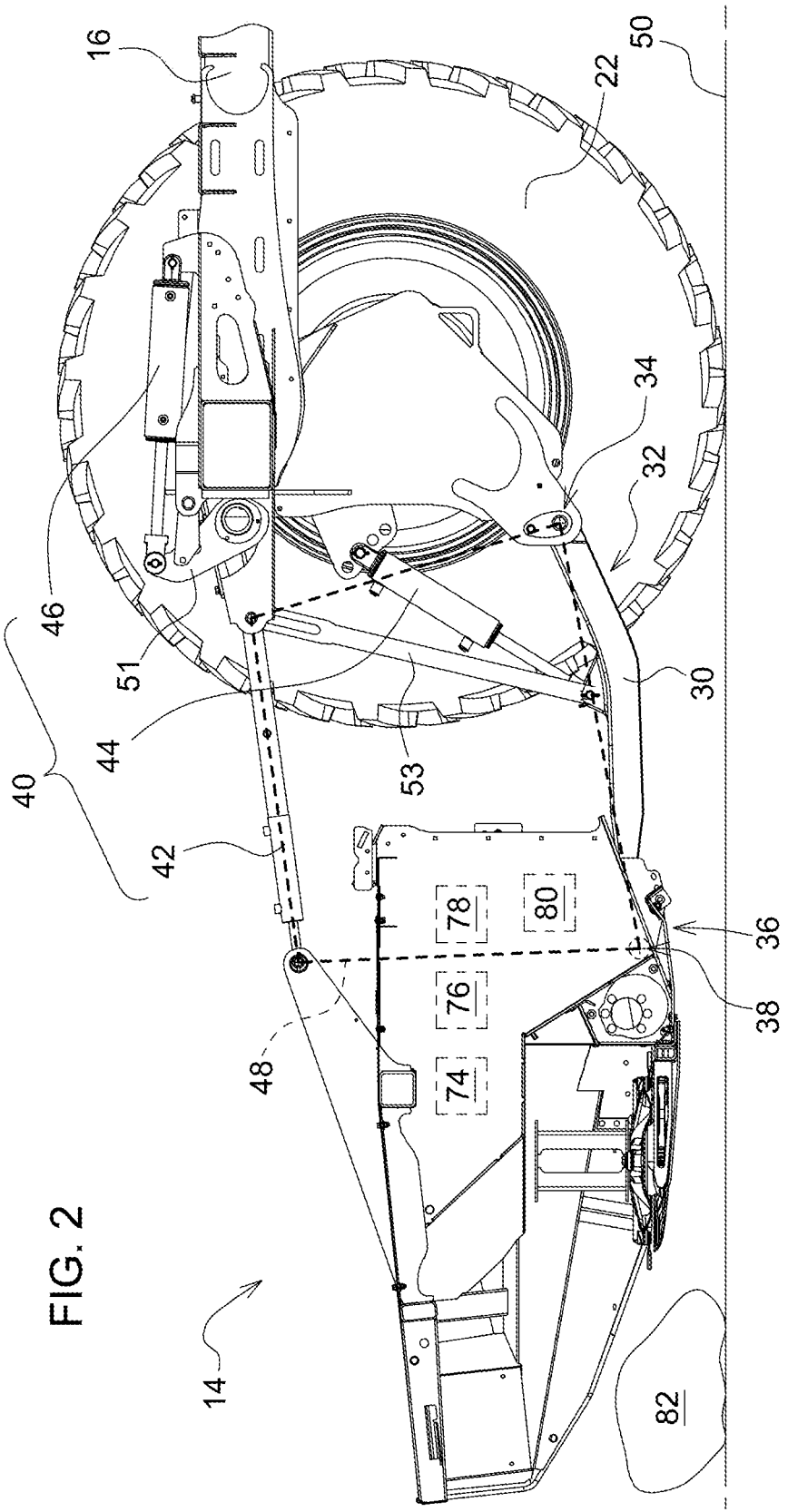
FIG. 2 is a schematic side view of a header of the windrower of FIG. 1.
Figure 3:
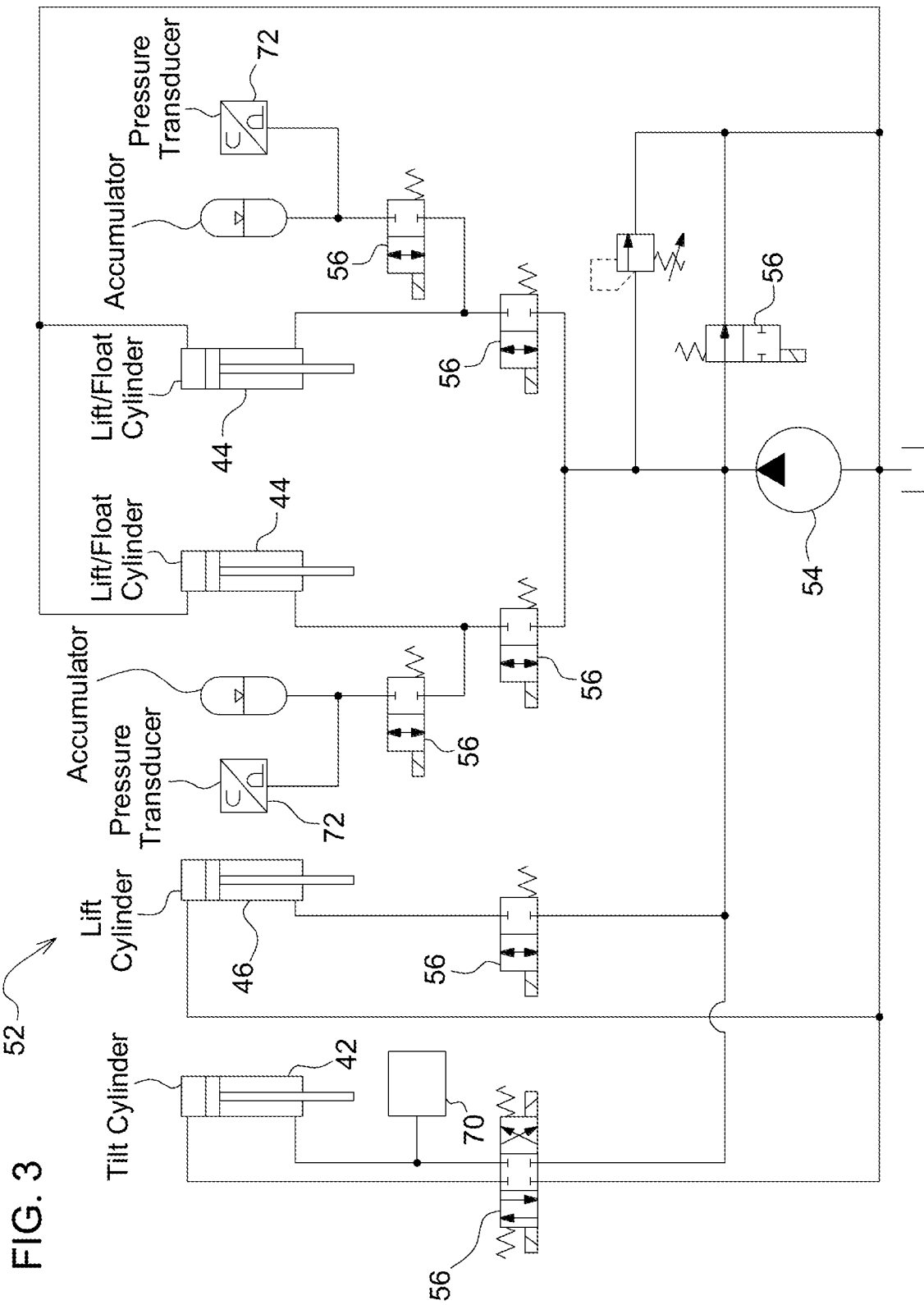
FIG. 3 is a hydraulic system schematic for the windrower of FIG. 1.

With reference to FIGS. 2 and 3, the header 14 includes a frame 26, and a cutter bar 28 coupled to the frame 26 and operably coupled to the prime mover 18. The prime mover 18 powers the cutter bar 28 to perform a cutting operation to cut crops in a field (e.g., hay, small grain crops, etc.). The header 14 is moveably connected to the chassis 16 by one or more arms 24 (only one being shown in FIG. 2) having a first end 32 pivotably coupled to the chassis 16 at a first pivot location 34, and a second end 36 pivotably coupled to the header 14 at a second pivot location 38.

The header 14 is further coupled to the chassis 16 by a plurality of actuators 40. The actuators 40 are operable to adjust the position and the orientation of the header 14 relative to the chassis 16. In some constructions, the actuators 40 can include hydraulic cylinders, electric motorized actuators, mechanical spring assemblies, and the like. In the embodiment illustrated in FIGS. 2 and 3, the actuators 40 include a tilt cylinder 42, one or more float cylinders 44, and a lift cylinder 46. The arms 30, the header 14, the tilt cylinder 42, and the chassis 16 form a four-bar linkage 48.

The tilt cylinder 42 is configured as a single double-acting hydraulic tilt cylinder 42 that extends or retracts to adjust a tilt angle defined between the cutter bar 28 and a ground surface 50, and thereby makes refinements in a cut height of the crop being cut. Specifically, actuation of the tilt cylinder 42 causes the cutter bar 28 to pivot relative to the arms 30 about the second pivot location 38.

The float cylinders 44 (only one is shown in FIG. 2) are configured as single-acting hydraulic float cylinders 44 that connect the chassis 16 and the arms 30. The float cylinders 44 at least partially support a weight of the header 14, and actuation of the float cylinders 44 tends to cause the arms 30 to pivot relative to the chassis 16 about the first pivot location 34. In the construction illustrated in FIGS. 2 and 3, the windrower 10 includes two float cylinders 44 that support the weight of the header 14 and enable the header 14 to follow the ground surface 50 over changing terrain. Moreover, in the construction illustrated in FIGS. 2 and 3, the lift cylinder 46 is a separate component from the float cylinders 44 that is coupled between the chassis 16 and a rockshaft 51 pivotably coupled to the chassis 16. In turn, the rockshaft 51 is coupled to the arms 30 via a slotted lift link 53. The lift cylinder 46 is configured to extend or retract to lower or raise the header 14 relative to the ground surface 50.

FIG. 3 illustrates a partial schematic of an embodiment of a hydraulic system 52 configured to supply fluid to implements of the windrower 10, including the actuators 40 comprising the tilt cylinder 42, the float cylinders 44, and the lift cylinder 46. A basic layout of a portion of the hydraulic system 52 is shown for clarity and one of ordinary skill in the art will understand that different hydraulic, mechanical, and electrical components can be used depending on the machine and the moveable implements.

The hydraulic system 52 includes at least one pump 54 that supplies fluid, for example hydraulic oil, to one or more downstream components. The pump 54 can be capable of providing an adjustable output, for example a variable displacement pump or variable delivery pump. Although only a single pump 54 is shown, two or more pumps may be used depending on the requirements of the system and the work machine.

In the illustrated embodiment, the hydraulic system also includes a plurality of valves 56 in fluid communication with the pump 54 such that the pump 54 delivers fluid to valves 56. In some embodiments, the valves 56 are electrohydraulic valves that receive the hydraulic fluid from the pump 54 and control the delivery of the hydraulic fluid to the actuators 40 including the tilt cylinder 42, the float cylinders 44, and the lift cylinder 46.

Figure 4:
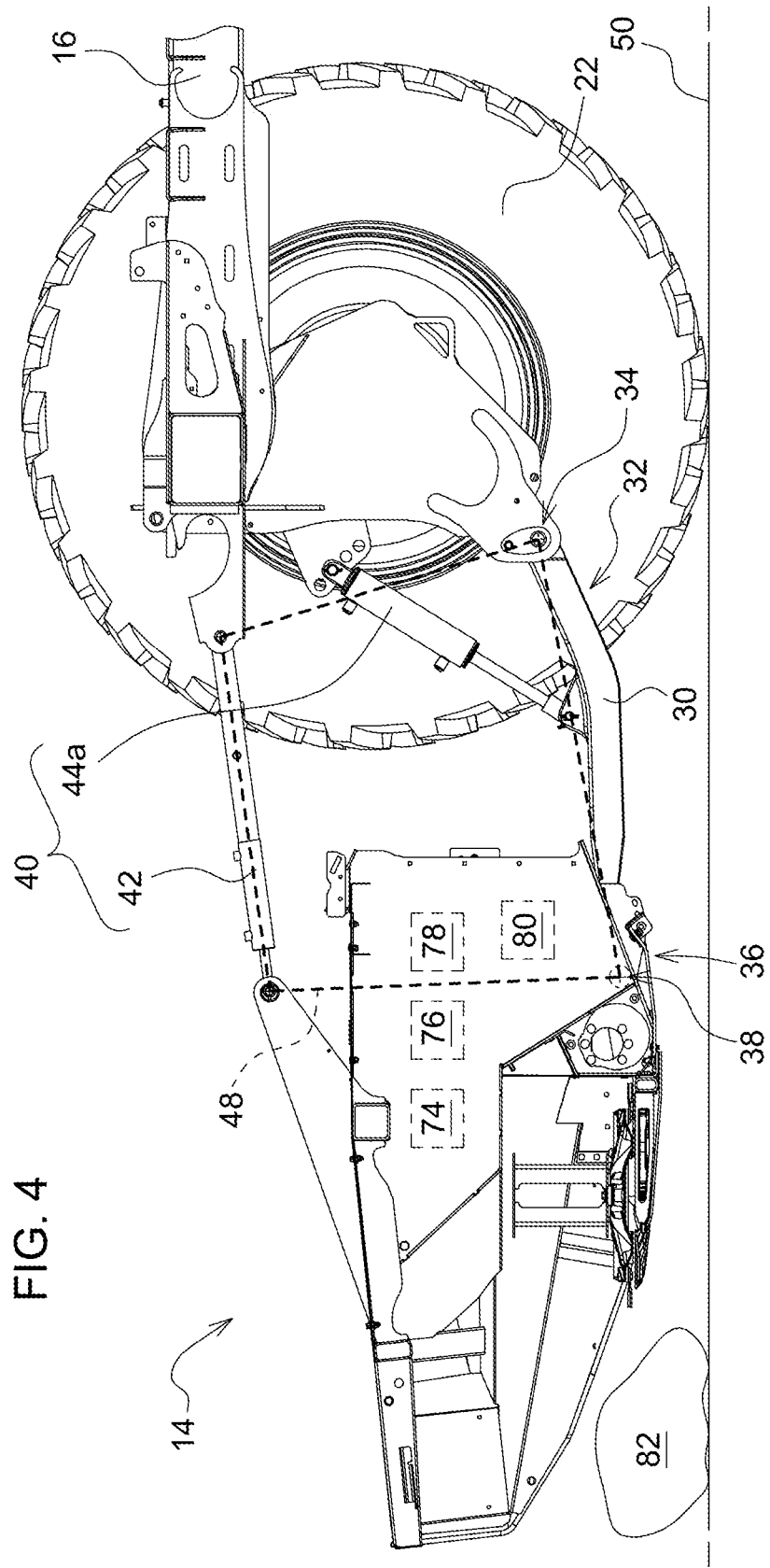
FIG. 4 is a schematic side view of a header of the windrower of FIG. 1 according to another embodiment.
Figure 5:
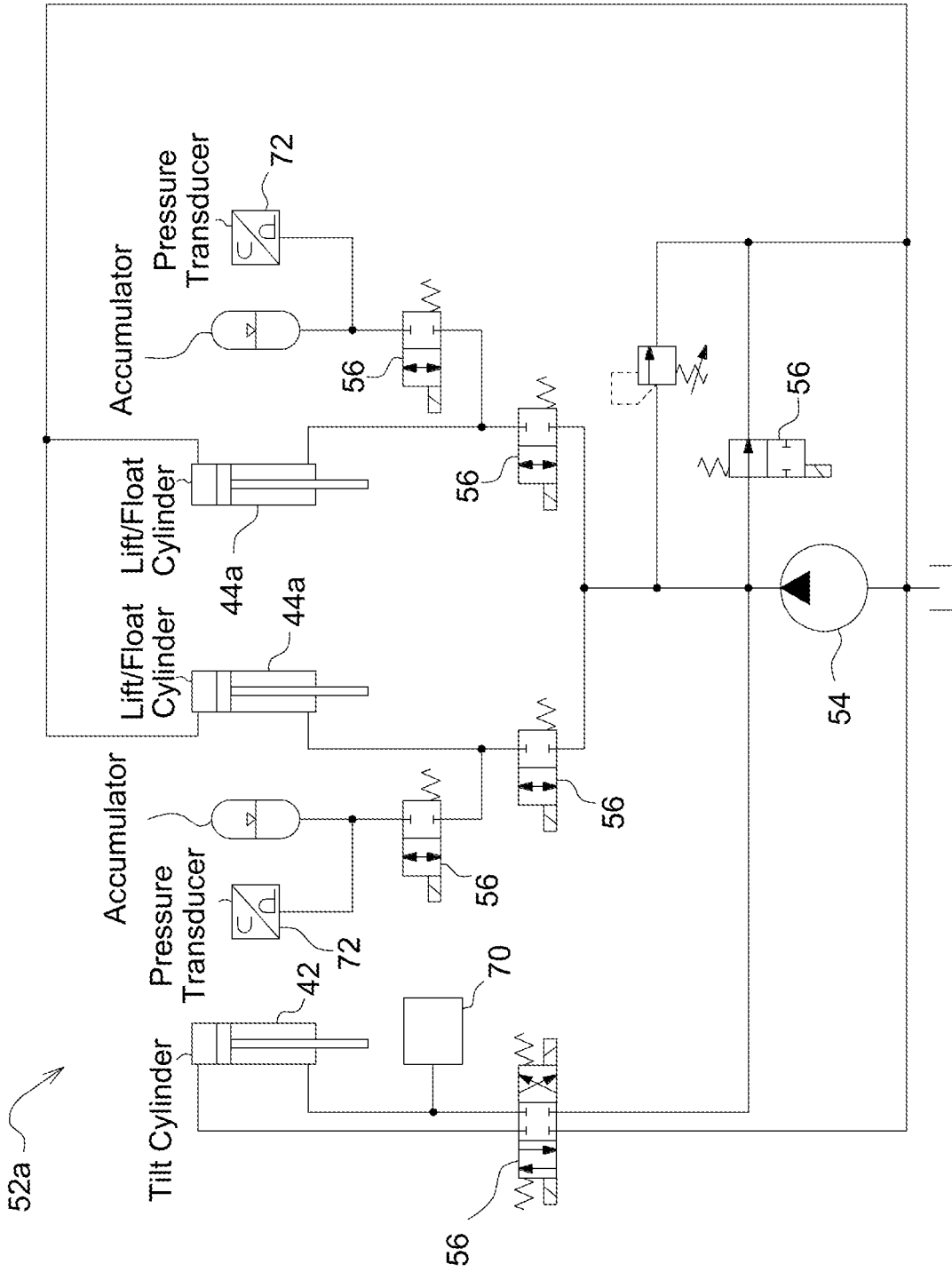
FIG. 5 is a hydraulic system schematic for the windrower of FIG. 1 according to another embodiment.

FIGS. 4 and 5 illustrate another embodiment of the windrower 10. The embodiment illustrated in FIGS. 4 and 5 includes the same elements previously described with respect to the embodiment of FIGS. 2 and 3, except that the embodiment of FIGS. 4 and 5 includes a hydraulic system 52a that differs from the hydraulic system 52 described above. Specifically, the hydraulic system 52a does not include a separate lift cylinder. Instead, the hydraulic system 52a includes a pair of combination float and lift cylinders 44a configured to support the weight of the header 14 to enable the header to follow the ground surface 50 over changing terrain, and they are further configured to raise or lower the header 14 relative to the ground surface 50. The combination float and lift cylinders 44a of the hydraulic system 52a perform the combined functions of both the float cylinders 44 and the tilt cylinder 42 of the hydraulic system 52 described above in connection with FIGS. 2 and 3.

Figure 6:
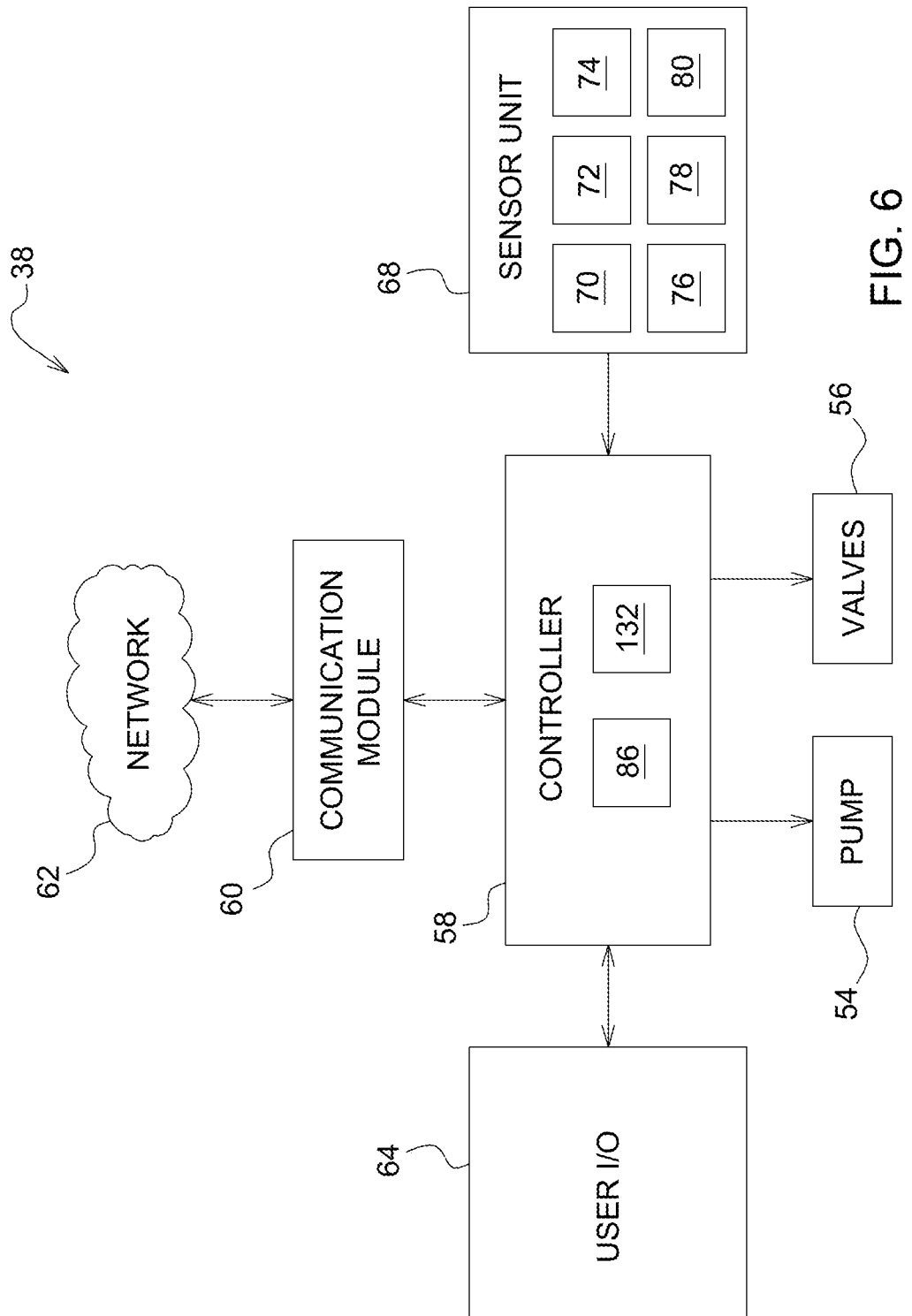
FIG. 6 is a schematic of a control system for the windrower of FIG. 1

FIG. 6 illustrates an embodiment of the control system 24 that is configured to control the operation of various components of the windrower 10, including either of the hydraulic systems 52 and 52a described above. The control system 24 includes a controller 58 with a plurality of inputs and outputs that are operable to receive and transmit information and commands to and from different components in the windrower 10. Communication between the controller 58 and the different components can be accomplished through a CAN bus, another communication link (e.g., wireless transceivers), or through a direct connection. The control system 24 also includes a communication module 60 configured to connect to and communicate with other devices (e.g., a computer, another work machine, etc.) through a network 62. The network 62 can be, for example, a wide area network ("WAN") (e.g., a global positioning system ("GPS"), a TCP/IP based network, a cellular network, etc.).

The control system 24 further includes a user input/output module 64 that includes one or more operator input mechanisms 65 in communication with the controller 58. The one or more operator input mechanisms 65 can include, for example, a joystick, throttle control mechanism, pedal, lever, switch, or other control mechanism. The operator input mechanisms 65 are located within the cab 20 of the windrower 10 and can be used to control the position of the header 14 by adjusting the hydraulic actuators 40. The user input/output module 64 can also include one or more input/output mechanisms such as, for example, a touch screen display device such as a control screen 66 (FIG. 17) located in the cab 20.

The controller 58 includes memory for storing software, logic, algorithms, programs, a set of instructions, etc. for controlling the valves 56 and other components of the windrower 10. The controller 58 also includes a processor for carrying out or executing the software, logic, algorithms, programs, set of instructions, etc. stored in the memory. The memory can store look-up tables, graphical representations of various functions, and other data or information for carrying out or executing the software, logic, algorithms, programs, set of instructions, etc.

The controller 58 is in communication with the valves 56 and can send control signals to the valves 56 and to the pump 54 to adjust the output or flowrate to the actuators 40 including the tilt cylinder 42, the float cylinders 44, and the lift cylinder 46, or in some embodiments, the combination float and lift cylinders 44a. The types of control signals and how the valves 56 are adjusted will vary dependent on the system. For example, one or more of the valves 56 can be an electrohydraulic servo valve that adjusts the flow rate of hydraulic fluid to the actuators 40 based on the received control signal.

A sensor unit 68 comprising one or more sensors can be associated with the actuators 40 or other components of the header 14. The sensor unit 68 can detect information relating to the header 14 and provide the detected information to the controller 58. For example, one or more sensors can detect information relating to actuator position, load experienced by the actuator, cylinder pressure, fluid temperature, or movement speed of the actuators, as well as header position or acceleration, or characteristics of the ground surface 50. Although described as a single unit related to the header 14, the sensor unit 68 can encompass sensors positioned at any position within the windrower 10 or associated with the windrower 10 to detect or record operating information.

With reference to FIG. 6, the sensor unit 68 includes a tilt pressure sensor 70 in communication with the tilt cylinder 42, and float pressure sensors 72 in communication with the float cylinders 44. The pressure sensors 70, 72 are used to measure the load on the tilt cylinder 42 and in the float cylinders 44, respectively. In some embodiments, the pressure sensors 70, 72 are pressure transducers.

FIGS. 2, 4, and 6 show a tilt position sensor 74 associated with the sensor unit 68. The tilt position sensor 74 is configured to detect or measure the tilt position of the header 14 relative to the chassis 16 and transmit that information to the controller 58. The tilt position sensor 74 can be configured to directly measure the tilt position of the header 14 or to indirectly measure the tilt position of the header 14 by the position or movement of the tilt cylinder 42. In one embodiment, the tilt position sensor 74 can be a rotary position sensor that measures the tilt position of the header 14 relative to the chassis 16. In another embodiment, the tilt position sensor 74 can be an in-cylinder position sensor that directly measures the position of the hydraulic piston in the tilt cylinder 42.

With reference to FIGS. 2, 4, and 6, the sensor unit 68 may also include one or more header height sensors 76 configured to detect or measure the height of the header 14 relative to the ground surface 50 and transmit that information to the controller 58. The header height sensors 76 can be configured to directly measure the height of the header 14 relative to the ground surface 50. Or, the header height sensors 76 can be configured to indirectly measure the height of the header 14 by the position or movement of the float cylinders 44, the tilt cylinder 42, or, in the embodiment shown in FIGS. 4 and 5, the combination float and lift cylinders 44a. In one embodiment, the header height sensors 76 can be rotary position sensors that measure the height of the header 14 relative to the chassis 16. In another embodiment, the header height sensors 76 can be in-cylinder position sensors that directly measure the position of the hydraulic piston in the tilt cylinder 42, or in each respective float cylinder 44 or in each respective combination float and lift cylinder 44a.

With reference to FIGS. 2, 4, and 6, in some embodiments, the sensor unit 68 can include an accelerometer 78 coupled to the header 14. The accelerometer 78 is configured to detect or measure the acceleration of the header 14 and transmit that information to the controller 58. In some embodiments, the accelerometer 78 can detect or measure the acceleration of a component that couples the header 14 to the chassis 16, such as the arms 24, the actuators 40, or other members or linkages. In the same or other embodiments, the sensor unit 68 can include a camera 80 coupled to the windrower 10. The camera 80 can be forward, side, or rearward facing. Additional sensors may be associated with the sensor unit 68 and one or more additional sensor units can be incorporated into the control system 24.

During operation, an operator drives the windrower 10 along rows or passes in a field. The operator manipulates the one or more input mechanisms 65 to adjust the position and operation of the header 14, including the header height, the header tilt, and the header float pressure. If the windrower 10 encounters changes in the ground surface 50, such as obstacles 82 (FIGS. 2 and 4) or undulating terrain, the operator can make adjustments to overcome these changes using the input mechanisms 65 or the control screen 66.

FIG. 7 schematically illustrates an exemplary field map 84 that contains information about a corresponding field to be cut, including obstacles or changes in terrain in the field, their respective sizes or magnitudes, their respective locations, and the like. Field maps such as the field map 84 can be created by an obstacle detection and mapping module executable by the controller 58 during operation of the windrower 10. The field map 84 can be stored in a field map database, which can be stored locally (e.g., in the memory of the controller 58) or remotely (e.g., in a remote server accessible via the network 62). Examples of obstacle detection and mapping modules, and of field maps created by such obstacle detection and mapping modules, are disclosed in U.S. Nonprovisional patent application Ser. No. 17/008,300, filed Aug. 31, 2020, entitled "OBSTACLE DETECTION AND FIELD MAPPING FOR A WORK VEHICLE", the entire contents of which is hereby incorporated by reference.

The field map 84 can be referenced by the controller 58 during operation of the windrower 10, and the controller 58 can be configured to make adjustments to, e.g., the tilt pressure, the float pressure, the header height, etc., based on information contained in the field map 84. The field map 84 can also be changed or updated by controller 58 when the controller 58 detects differences between the field map 84 and the corresponding field being cut (based on, e.g., signals from the sensor unit 68, operator inputs, information received via the communication module 60, etc.). The field map 84 can also be displayed on, e.g., the control screen 66 (FIG. 8) in the cab 20 and referenced by the operator during operation of the windrower 10. The displayed field map 84 comprises a graphical representation of a field to be cut by the windrower 10, and includes a start location 120, an end location 122, and a path of travel 124 traversed by the windrower 10 between the start and end locations 120, 122. The path of travel 124 is divided into rows or passes 126. The field map 84 also includes exemplary events 128a-128d located at discrete locations along the passes 126 of the path of travel 124. A first event 128a may include a "high impact" event representative of a large obstacle previously identified and stored in the field map database via the obstacle detection and mapping module 86 (FIG. 6). A second event 128b may include an "undulating terrain" event, a third event 128c may include a "hole" event, and a fourth event 128d may include a "medium impact" event. The displayed field map 84 may likewise be used by the operator to make adjustments during operation of the windrower 10, e.g., adjust the float pressure, the header tilt, the header height, etc. based on the location and associated information for each event 128a-128d.

FIG. 8 illustrates the operator input mechanisms 65 and the control screen 66 located inside the cab 20. The field map 84 may be displayed to the operator via the control screen 66, including the start location 120, the end location 122, the path of travel 124, the passes 126, and the events 128a-128d. In addition, the controller 58 may be configured to display an alert 130 associated with one of the events 128a-128d to alert the operator when the windrower 10 is approaching the event. In other embodiments, the field map 84 may be viewed from other devices, e.g., from a smartphone, a remote computer, etc.

With reference to FIG. 6, the controller includes a field learning and optimization module 132 that includes instructions that will adjust one or more of the float setting, the tilt setting, and the lift setting of the header 14 to optimize operation of the windrower 10, based on information contained field maps 84. The field learning and optimization module 132 will also identify differences between the information stored in the field map 84 and information detected while operating within the corresponding field, and update the field map 84 with new information as appropriate. Additional, non-limiting examples of a similar field learning and optimization module are disclosed in U.S. Nonprovisional patent application Ser. No. 17/008,312, filed Aug. 31, 2020, entitled "AUTOMATED HEADER FLOAT OPTIMIZATION AND FIELD LEARNING FOR A WORK VEHICLE", the entire contents of which is hereby incorporated by reference.

FIG. 9 shows a partial flow diagram of a first set of instructions 200 of the field learning and optimization module 132 comprising a "Tilt Optimization" algorithm 20. When executed by the controller 58, the "Tilt Optimization" algorithm 200 loads a field map 84 from the field map database and routes the mapped field information in the field map 84 to one or more goal-based optimization algorithms for creating optimized operational settings for the windrower 10 when operated in a corresponding field. The goal-based optimization algorithms may provide different automation techniques to fit a specific operator need, such as minimizing wear and damage of the header 14. For example, the goal-based optimization algorithms may include an "Obstacle Alert" algorithm 300 (FIG. 10), a "Header Damage Prevention" algorithm 400 (FIG. 11), and a "Balanced Cut Height" algorithm 500 (FIG. 12), each of which will be discussed in further detail herein.

The controller 58 runs the "Tilt Optimization" algorithm 200 (step 202), and loads the field map database (which can be loaded from, e.g., the memory of the controller 58, or a remote server accessed via the network 62) (step 204). Next, the controller 58 determines whether a field map 84 for the field to be cut is saved in the field map database (step 206). If no field map 84 is stored in the database, the controller 58 notifies the operator by displaying an alert to the control screen 66, and further prompts the operator to indicate whether a new field map 84 for the field should be generated (step 208). If the operator indicates a desire to map the field, the controller 58 initiates a mapping mode by executing the obstacle detection and field mapping module 86 (discussed above) (step 210). If the operator does not indicate a desire to map the field, the controller 58 ends the "Tilt Optimization" algorithm 200 and enters a manual mode (step 212). If a field map 84 for the field is found in the field map database, then the controller 58 routes the mapped field information to one of the goal-based optimization algorithms such as the "Obstacle Alert" algorithm 300, the "Header Damage Prevention" algorithm 400, and the "Balanced Cut Height" algorithm 500 based on a selection by the operator (step 214).

Figure 10:
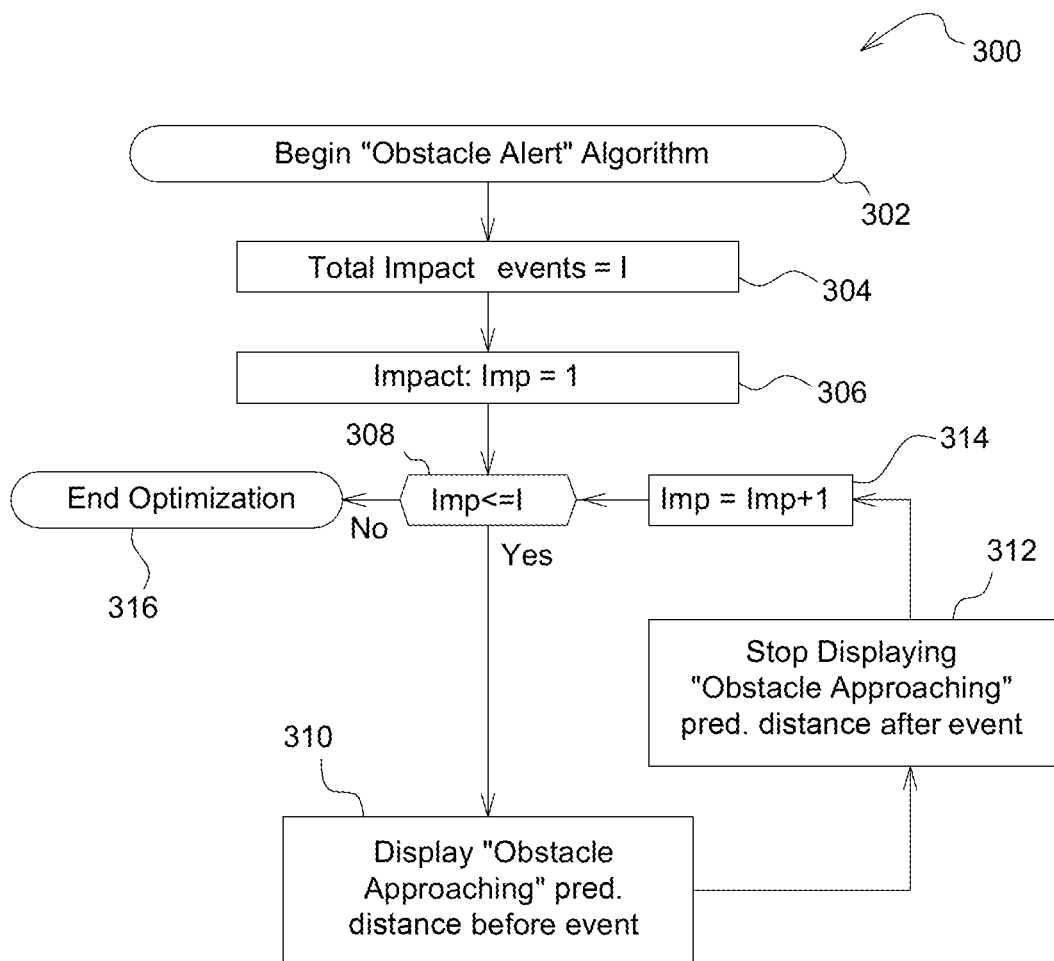

FIG. 10 shows a partial flow diagram of a second set of instructions 300 of the field learning and optimization module 132 comprising the "Obstacle Alert" algorithm 300. When executed by the controller 58, the "Obstacle Alert" algorithm 300 alerts the operator of an upcoming obstacle or change in terrain while the windrower 10 is operating in a field. The alerts may recommend that the operator change the position of the header tilt system (via actuation of the tilt cylinder 42) to allow the header 14 to cruise over the obstacle or undulating terrain, thus reducing potential impact forces and wear on the header 14. While executing the "Obstacle Alert" algorithm 300, the controller 58 monitors a GPS location of the windrower 10 in the field (e.g., supplied to the controller 58 via the communication module 60) to determine proximity of the windrower 10 to geotagged impact events included in the corresponding field map 84 (such as the events 128a-128d described above).

When the "Obstacle Alert" algorithm 300 is selected (e.g., via operator input), the controller 58 begins the "Obstacle Alert" algorithm 500 (step 302) and analyzes the field map 84 to identify I number of impact events, such as the events 128a-128d described above (step 304). The controller 58 assigns an impact event variable Imp to the impact events, initialized to 1 (step 306). The controller 58 then determines whether the impact event variable Imp is less than or equal to the number of impact events I (step 308). If so, the controller 58 displays an alert 130 (FIG. 8) to the operator about the upcoming impact event Imp when the windrower 10 moves to within a predetermined distance from the impact event Imp (step 310). After the windrower 10 moves past the location of the impact event Imp, the controller 58 stops displaying the alert 130 after moving a predetermined distance beyond the impact event Imp (step 312). To determine when the windrower 10 has moved to within or beyond the predetermined distance from the impact event Imp, the controller 58 can compare the monitored GPS location of the windrower 10 with the geotagged GPS location of the impact event Imp, included in the field map 84. The alert 130 may include text displayed via the control screen 66 (e.g., "Obstacle Approaching"), as well as other audible or visible formats. Next, the controller 58 updates the impact variable Imp to reflect the next mapped impact event Imp+1 (step 314), and repeats steps 308-314 for each mapped impact event Imp in the field. Returning to step 308, if the impact variable Imp is not less than or equal to the number of impact events I, then the controller 58 ends the "Obstacle Alert" algorithm 300 (step 316).

Figure 11:
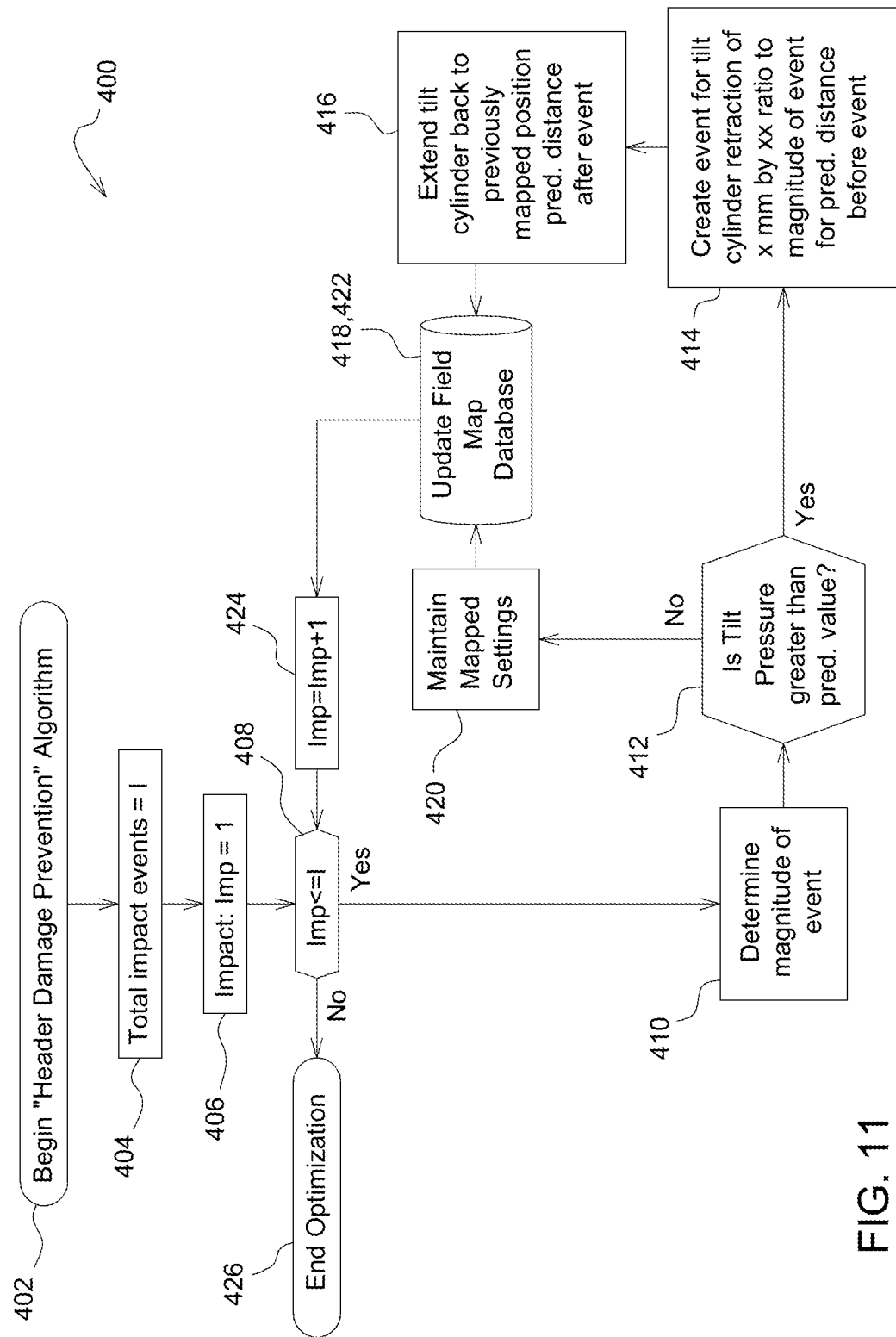

FIG. 11 shows a partial flow diagram of a third set of instructions 400 of the field learning and optimization module 132 comprising the "Header Damage Prevention" algorithm 400. When executed by the controller 58, the "Header Damage Prevention" algorithm 400 creates an automation technique that selectively retracts and extends the tilt setting of the header 14 (e.g., via actuation of the tilt cylinder 42) during operation of the windrower 10. By selectively retracting the tilt setting when traversing obstacles mapped in the field map 84, an impact force between the header 14 and the obstacle may be reduced to prevent damage to the header 14. When executing the "Header Damage Prevention" algorithm 400, the controller 58 monitors the tilt pressure for mapped impact events (such as the events 128a-128d described above) to determine whether the tilt setting of the header 14 should be adjusted. If the controller 58 determines that an upcoming mapped impact event warrants an adjustment to the tilt setting, the controller 58 retracts the tilt cylinder 42 by a given ratio at a predetermined distance before the location of the impact event, and subsequently extends the tilt cylinder 42 back to the mapped setting at a predetermined distance after the location of the impact event.

When the "Header Damage Prevention" algorithm 400 is selected (e.g., via operator input), the controller 58 begins the "Header Damage Prevention" algorithm 400 (step 402) and analyzes the field map 84 to identify I number of impact events, such as the events 128a-128d described above (step 404). The controller 58 assigns an impact event variable Imp to the impact events, initialized to 1 (step 406). The controller 58 then determines whether the impact event variable Imp is less than or equal to the number of impact events I (step 408). If so, the controller 58 determines a magnitude of the upcoming impact event Imp to create an adjustment ratio for making adjustments to the position of the tilt cylinder 42 (step 410). The controller 58 then determines whether the mapped tilt pressure of the header 14 (e.g., stored in the field map 84) for the next upcoming impact event Imp is greater than a predetermined threshold tilt pressure value (step 412). A dead band filter may be used to filter relatively minor deviations from the predetermined threshold tilt pressure valve to prevent nuisance adjustments to the header tilt setting. If the mapped tilt pressure of the header 14 is greater than the predetermined threshold tilt pressure value, the controller 58 creates an event to retract the tilt cylinder 42 by the adjustment ratio at a predetermined distance before the location of the upcoming impact event Imp (step 414). The adjustment ratio calibrates the adjustment to the tilt setting to account for the size of the obstacle or degree of the undulating terrain represented by the impact event Imp. The controller 58 also creates a corresponding subsequent event to extend the tilt cylinder 42 back to the mapped setting at a predetermined distance after the impact event Imp (step 416). The controller 58 then updates the field map database to include the pair of events generated at steps 314 and 316 for the given mapped impact event Imp (step 318). Returning to step 412, if the mapped tilt pressure of the header 14 (e.g., stored in the field map 84) for the next upcoming impact event Imp is not greater than the predetermined threshold tilt pressure value, then the existing mapped tilt settings (i.e., for the actuators 40 including the tilt cylinder 42) are maintained (step 420), and the field map database is updated (step 422). Next, the controller 58 updates the impact variable Imp to reflect the next mapped impact event Imp+1 (step 424), and repeats steps 408-424 for each mapped impact event Imp in the field. Returning to step 408, if the impact variable Imp is not less than or equal to the number of impact events I, then the controller 58 ends the "Header Damage Prevention" algorithm 400 (step 426).

Figure 12:
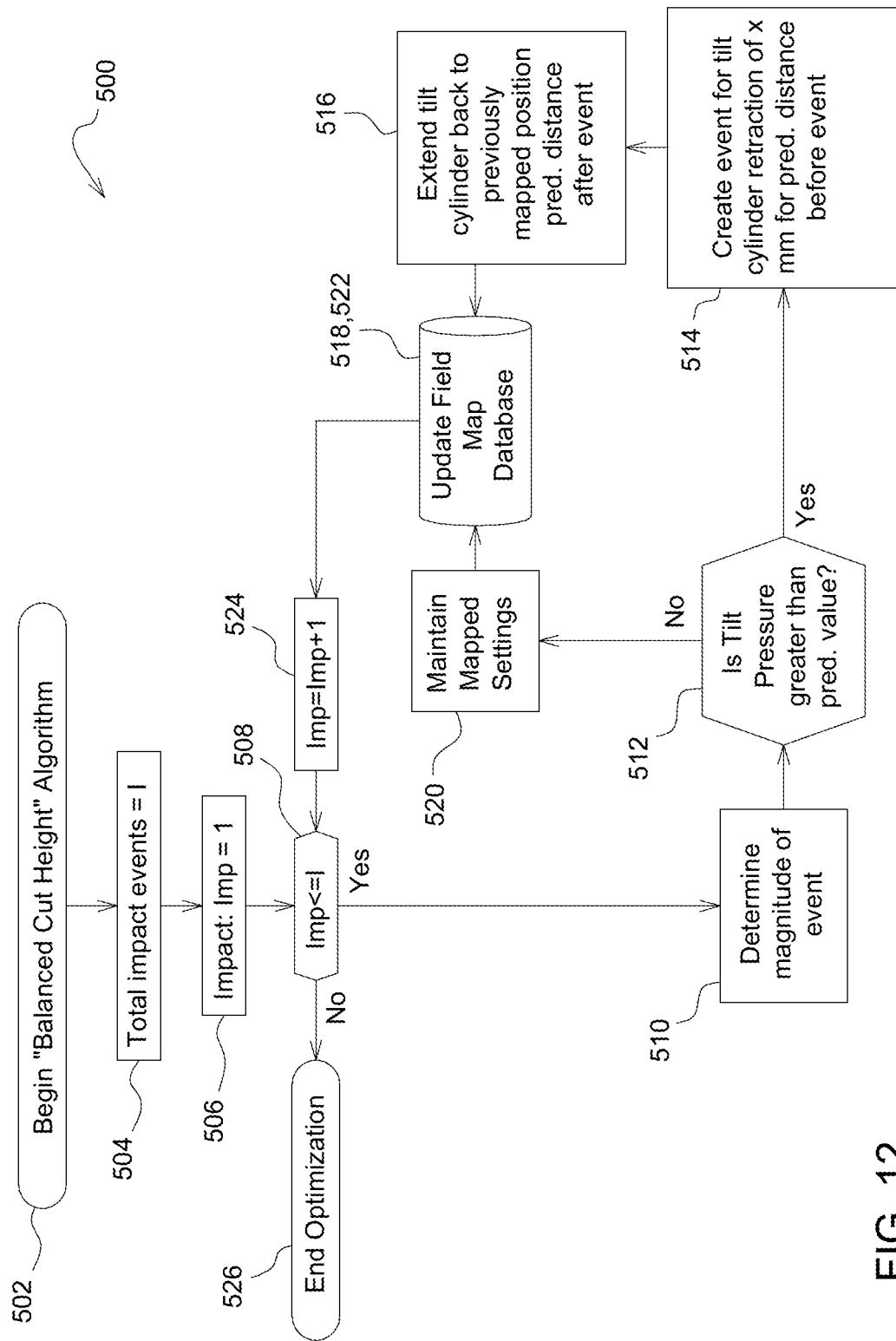

FIG. 12 shows a partial flow diagram of a fourth set of instructions 500 of the field learning and optimization module 132 comprising the "Balanced Cut Height" algorithm 500 similar to the "Header Damage Prevention" algorithm 400 discussed above. Much like the "Header Damage Prevention" algorithm 400, the "Balanced Cut Height" algorithm 500 instructs the controller 58 to create an automation technique that selectively retracts and extends the tilt setting of the header 14 (e.g., via actuation of the tilt cylinder 42) during operation of the windrower 10 to account mapped impact events. The steps of the "Balanced Cut Height" algorithm 500 correspond to the steps of the "Header Damage Prevention" algorithm 400 and include the same reference numerals in the 500 series of numbering. The following description will focus on the differences between the "Balanced Cut Height" algorithm 500 and the "Header Damage Prevention" algorithm 400. Unless noted otherwise, it should be understood that the corresponding steps of the "Balanced Cut Height" algorithm 500 and the "Header Damage Prevention" algorithm 400 are identical to one another.

The "Balanced Cut Height" algorithm 500 instructs the controller 58 to perform adjustments of a relatively smaller magnitude than those performed according to the "Header Damage Prevention" algorithm 400, thereby striking a balance between maintaining an optimal cutting height in the field and providing some reduction in damage or wear to the header 14. Specifically, the "Balanced Cut Height" algorithm 500 can differ from the "Header Damage Prevention" algorithm 400 at step 510 by defining a relatively smaller adjustment ratio, such that the adjustments are still made to the position of the tilt cylinder 42 at steps 514 and 516, but have a smaller magnitude than those made at steps 414 and 416 of the "Header Damage Prevention" algorithm 400. This results in a lower average cut height maintained by the header 14 while still making adjustments to account for the mapped impact events Imp. In other embodiments, step 510 may be omitted, and the adjustments performed at steps 514 and 516 can simply include retracting and extending the tilt cylinder 42 by a predetermined amount regardless of the magnitude of the given impact event Imp. The "Balanced Cut Height" algorithm 500 can also differ from the "Header Damage Prevention" algorithm 400 at step 512 by utilizing a relatively larger dead band filter out relatively larger impact events Imp, so that no adjustments are made at steps 514 and 516 for these impact events.

Figure 13:
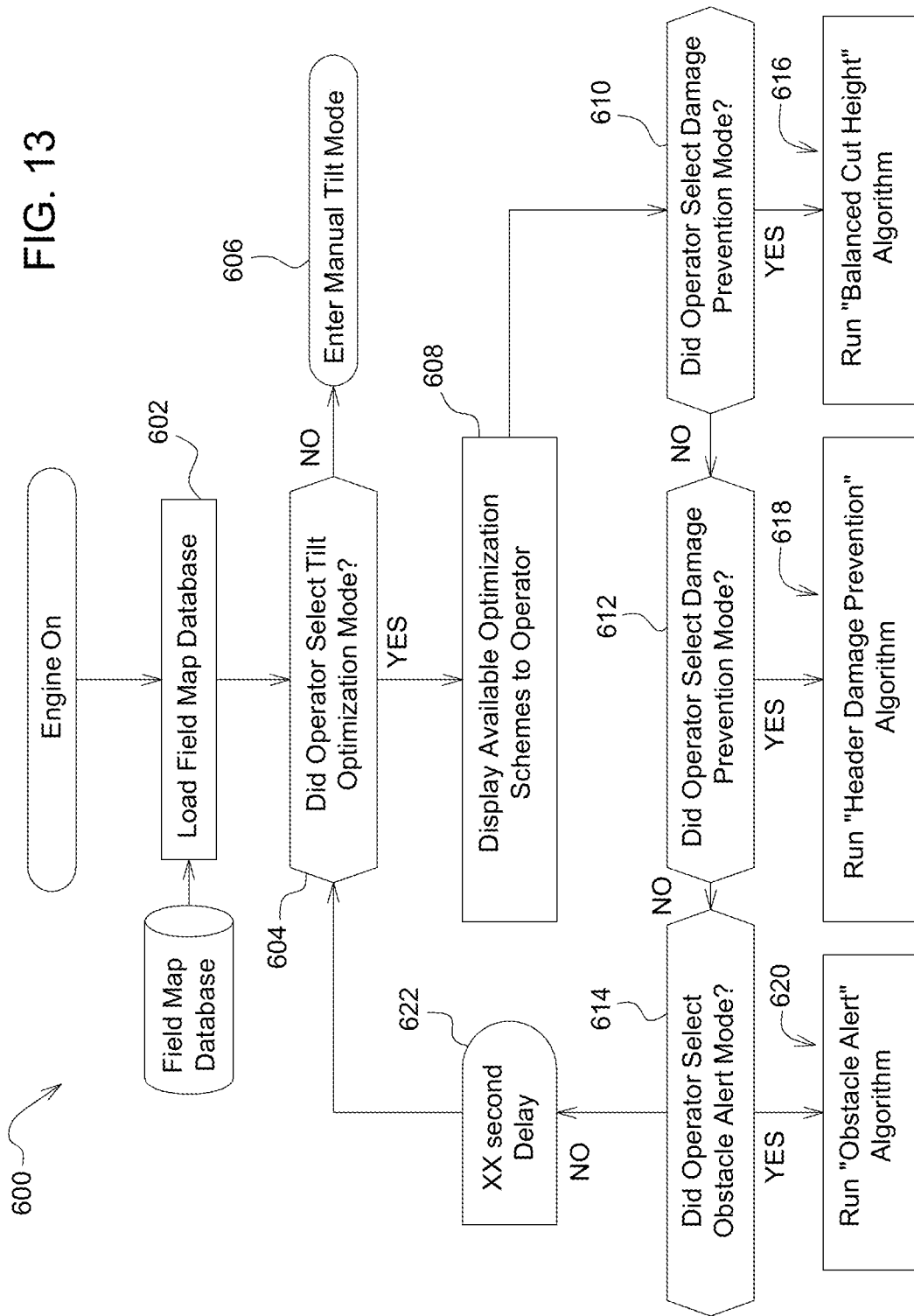

FIG. 13 shows a partial flow diagram of a fifth set of instructions 600 of the field learning and optimization module 132 that allows the operator to enable automatic tilt operation, whereby the controller 58 controls the actuators 40 to autonomously adjust the tilt settings of the header 14 while the windrower 10 is operating in a field. When the controller 58 executes the fifth set of instructions 600, the operator may select a goal (e.g., obstacle alert, header damage prevention, or balanced cut height) that the operator would like the windrower 10 to perform for the given field map 84. While the windrower 10 is operating, the controller 58 will automatically make tilt adjustments to the header 14 via the actuators 40 based on the updated field map 84 created by running the goal-based optimization algorithms discussed above, such as the "Obstacle Alert" algorithm 300, the "Header Damage Prevention" algorithm 400, and the "Balanced Cut Height" algorithm 500.

When the fifth set of instructions 600 is executed, the controller 58 loads the field map 84 corresponding to the field to be cut from the field map database (step 602). Next, the controller 58 determines whether the operator has selected (e.g., via the control screen 66) a tilt optimization mode associated with the goal-based optimization algorithms (step 604). If not, the controller 58 proceeds to enter a manual tilt mode whereby the tilt settings are controlled by operator input directly (step 606). If so, the controller 58 displays the available tilt optimization schemes available to the operator (e.g., via the control screen 66) (step 608). The controller 58 next determines whether a particular tilt optimization scheme has been selected by the operator (e.g., a balanced cut height mode, a header damage prevention mode, or an obstacle alert mode) (steps 610, 612, and 614). If so, the controller 58 proceeds to run the selected tilt optimization scheme (e.g., the "Balanced Cut Height" algorithm, the "Header Damage Prevention" algorithm 500, or an "Obstacle Alert" algorithm) (steps 616, 618, and 620). The windrower 10 will then proceed to automatically make adjustments to the tilt settings while moving through the field, according the selected tilt optimization scheme. If the controller 58 determines that the operator has not selected a specific tilt optimization scheme after a predetermined time delay period has passed (step 622), then the controller 58 returns to step 604.

Figure 14:
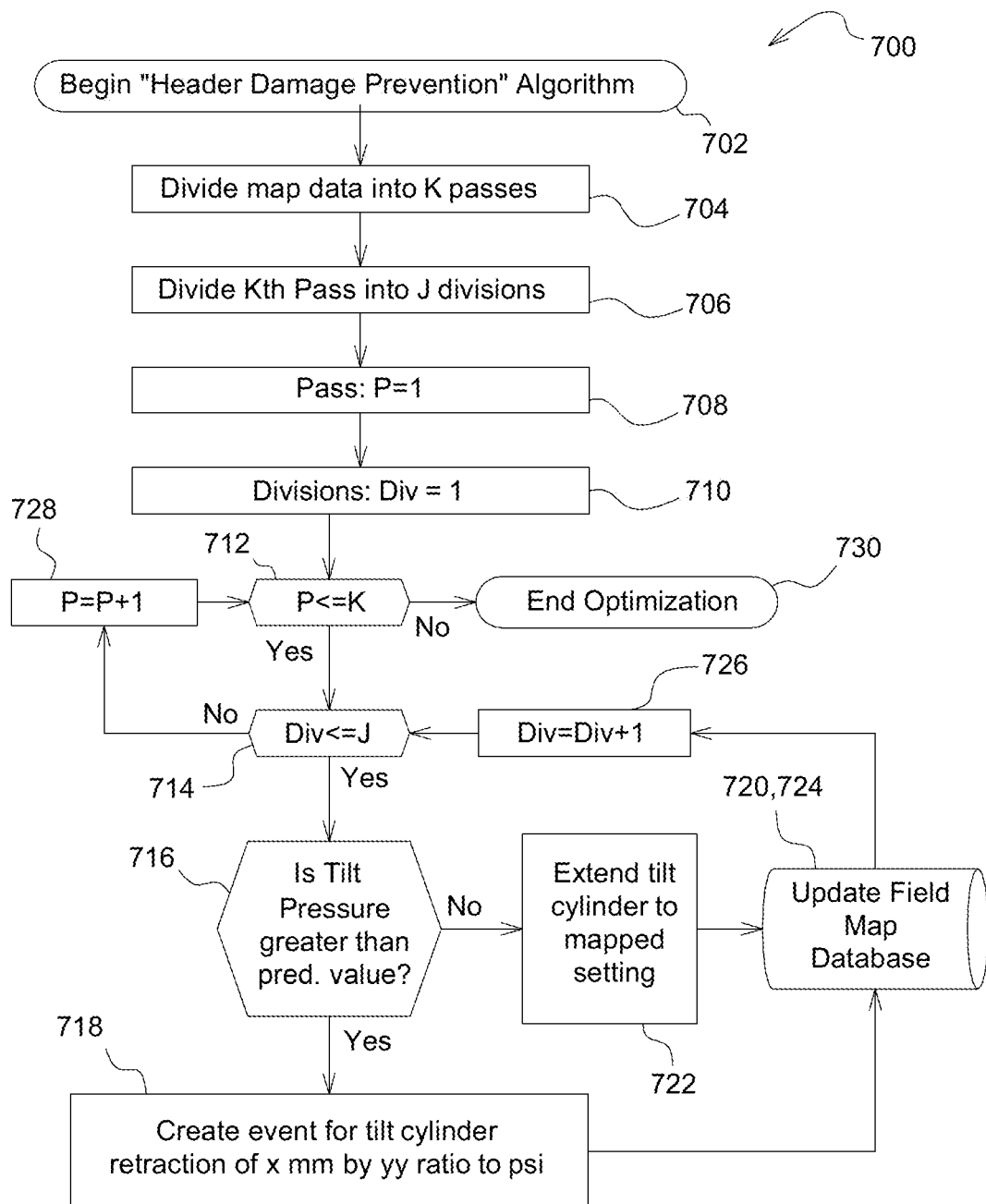

FIG. 14 shows a partial flow diagram of a sixth set of instructions 700 of the field learning and optimization module 132 comprising a modified "Header Damage Prevention" algorithm 700. When executed by the controller 58, the modified "Header Damage Prevention" algorithm 700 creates an automation technique that selectively adjusts the tilt setting of the header 14 during operation of the windrower 10 to prevent damage that may otherwise occur when the header 14 encounters undulating terrain. When executing the "Header Damage Prevention" algorithm 700, the controller 58 divides the field map 84 into one or more passes P and divides each pass P into one or more divisions Div. Then, the controller 58 monitors the tilt pressure (e.g., via the sensor unit 68) for each division Div to determine whether the tilt setting should be adjusted to prevent damage or wear to the header 14. If the controller 58 determines that the tilt pressure for a given division Div (previously acquired and stored in the field map 84) warrants an adjustment to the tilt setting, the controller 58 creates an event to retract the tilt cylinder 42 for the given division Div of the given pass P. Otherwise, the controller 58 extends the tilt cylinder 42 to the existing mapped setting for the given division Div.

When the "Header Damage Prevention" algorithm 700 is selected (e.g., via operator input), the controller 58 begins the "Header Damage Prevention" algorithm 700 (step 702) and analyzes the field map 84 to divide the field map 84 into K number of passes P (FIG. 7) (step 704). The controller 58 further divides each pass P into J number of divisions Div (FIG. 7) (step 706). The controller 58 assigns a pass variable P to the passes 126, initialized to 1 (step 708), and assigns a division variable Div to the divisions, initialized to 1 (step 710). The controller 58 next determines whether the pass variable P is less than or equal to the number of passes K (step 712). If so, the controller 58 determines whether the division variable Div is less than or equal to the number of divisions J for the given pass P (step 714). If so, the controller 58 determines whether the mapped tilt pressure of the header 14 (e.g., stored in the field map 84) for the given division Div is greater than a predetermined threshold tilt pressure value (step 716). The predetermined threshold pressure value can be less than the predetermined threshold tilt pressure value discussed above in connection with the "Header Damage Prevention" algorithm 400, to account for the relatively smaller increases in tilt pressure induced by undulating terrain as opposed to obstacles. If the mapped tilt pressure for the given division Div is greater than the predetermined threshold tilt pressure value, the controller 58 creates an event to retract the tilt cylinder 42 by a predetermined ratio for the given division Div (step 718). The controller 58 then updates the field map database to include the tilt cylinder retraction event generated at step 718 for the given division Div of the given pass P (step 720). The predetermined ratio can be based on the magnitude of the tilt pressure saved in the field map 84 for the given division Div. Moreover, the predetermined ratio can be less than the predetermined ratio discussed above in connection with the "Header Damage Prevention" algorithm 400, since undulating terrain may necessitate smaller adjustments than obstacles. Returning to step 716, if the mapped tilt pressure for the next given division Div is not greater than the predetermined threshold tilt pressure value, then the controller 58 extends the tilt cylinder 42 to the existing mapped setting for the given division Div of the current pass P (step 722), and the field map database is updated (step 724). Next, the controller 58 updates the division variable Div to reflect the next division Div+1 (step 726), and repeats steps 714-726 for each division Div in the given pass P of the field. Returning to step 714, if the division variable Div is not less than or equal to the total number of divisions J for the given pass P, then the controller 58 updates the pass variable P to reflect beginning a new pass P+1 and returns to step 712 (step 728). If, at step 712, the pass variable P is not less than or equal to the number of passes K, then the controller 58 ends the "Header Damage Prevention" algorithm 700 (step 730).

Figure 15:
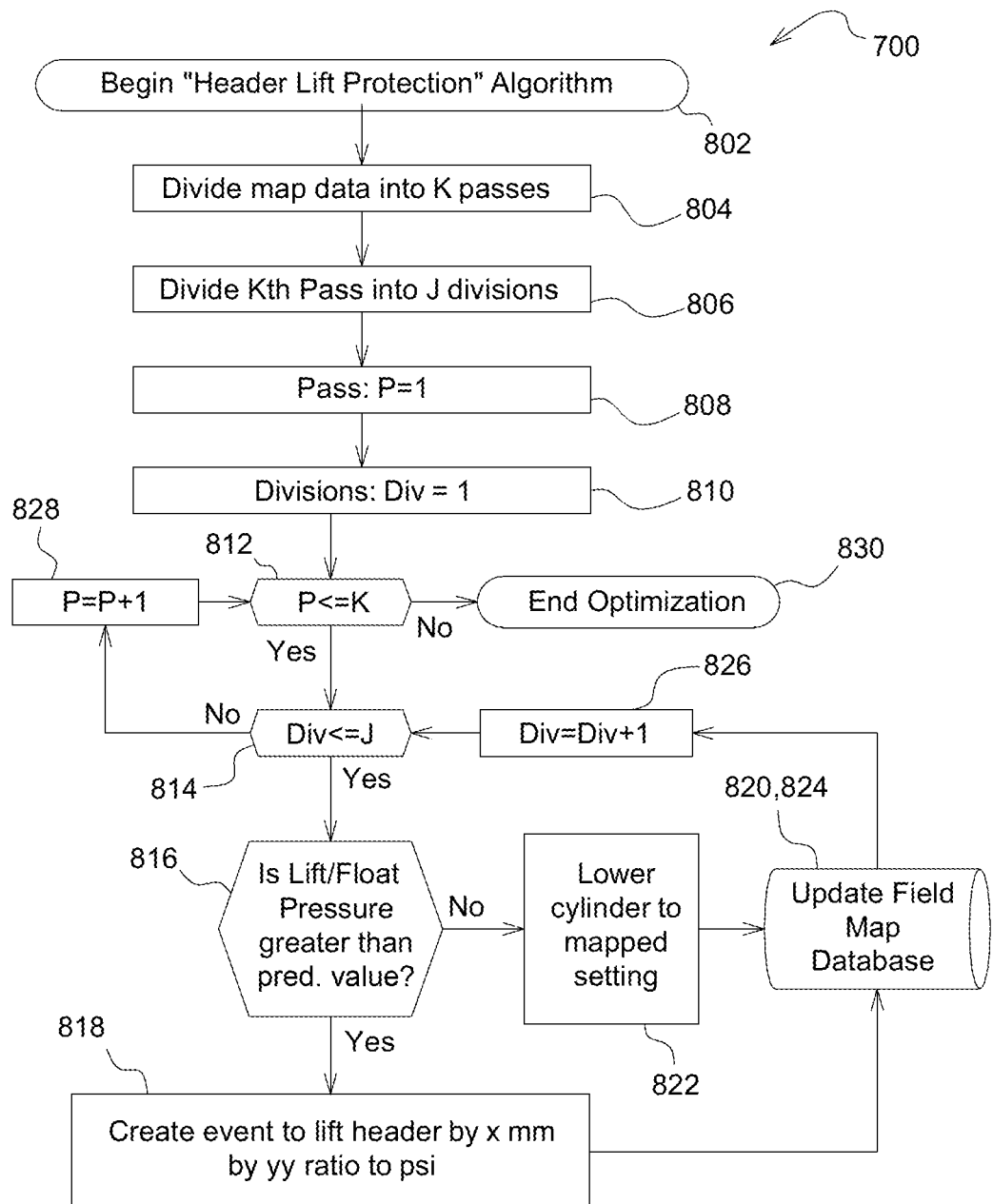

FIG. 15 shows a partial flow diagram of a seventh set of instructions 800 of the field learning and optimization module 132 comprising a modified "Header Damage Prevention" algorithm 800 similar to the "Header Damage Prevention" algorithm 700 discussed above. Much like the "Header Damage Prevention" algorithm 700, the "Header Damage Prevention" algorithm 800 instructs the controller 58 to create an automation technique that selectively adjusts the header 14 (e.g., via the actuators 40) during operation of the windrower 10 to account mapped undulating terrain or changes in contour. The steps of the "Header Damage Prevention" algorithm 800 correspond to the steps of the "Header Damage Prevention" algorithm 700 and include the same reference numerals in the 800 series of numbering. The following description will focus on the differences between the "Balanced Cut Height" algorithm 800 and the "Header Damage Prevention" algorithm 700. Unless noted otherwise, it should be understood that the corresponding steps of the "Header Damage Prevention" algorithms 700 and 800 are identical to one another.

Rather than considering the mapped tilt pressure for each division Div to determine whether the tilt setting should be adjusted, the "Header Damage Prevention" algorithm 800 instructs the controller 58 to consider the lift pressure and/or the float pressure to determine whether adjustments should be made to the header lift setting. Specifically, at step 816, the controller 58 determines whether the mapped lift pressure and/or the mapped float pressure of the header 14 for the given division Div is greater than predetermined threshold lift pressure and/or float pressure values. If so, the controller 58 creates an event to lift the header 14 (e.g., via the lift cylinder 46) by a predetermined ratio for the given division Div (step 818). The controller 58 then updates the field map database with the lift event (step 820). If, at step 816, the mapped lift pressure and/or float pressure for the given division Div is not greater than the predetermined threshold lift pressure and/or float pressure values, the controller 58 lowers the header 14 back to the mapped lift setting for the given division Div (step 822) and updates the field map database (step 824).

Figure 16:
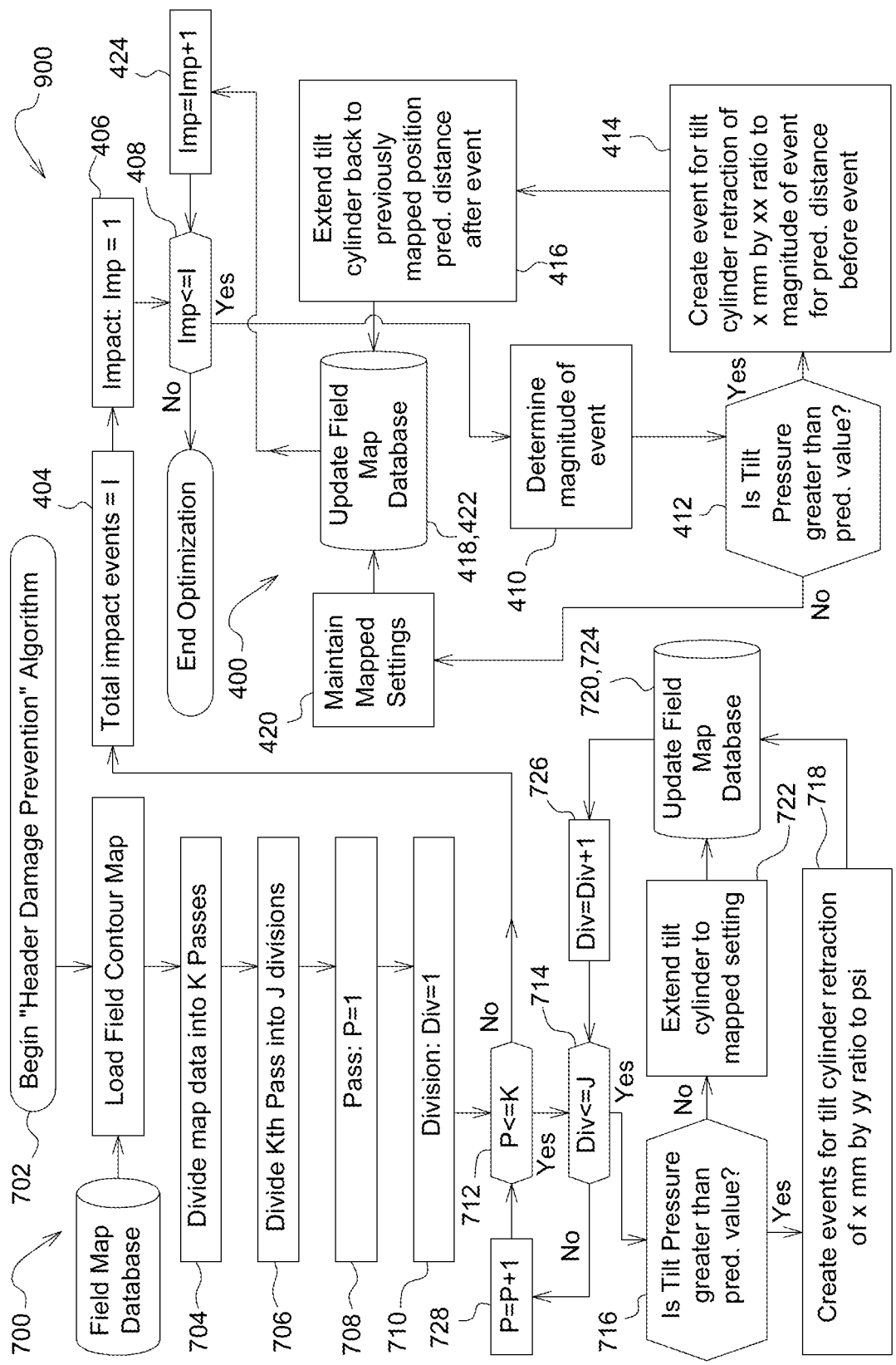

FIG. 16 shows a partial flow diagram of an eighth set of instructions 900 of the field learning and optimization module 132 comprising a combination "Header Damage Prevention" algorithm 900 that includes the "Header Damage Prevention" algorithm 400 for avoiding obstacles discussed above in connection with FIG. 11, and the "Header Damage Prevention" algorithm 700 for undulating terrain discussed above in connection with FIG. 14. The "Header Damage Prevention" algorithm 900 instructs the controller 58 to create an automation technique that selectively retracts and extends the tilt setting of the header 14 to prevent damage or wear that otherwise may occur due to the impact events Imp stored in the field map 84, and updates the field map 84 with the automated adjustments. The automation technique resulting from the "Header Damage Prevention" algorithm 900 also selectively retracts and extends the tilt setting of the header 14 for each division Div of each pass P, and updates the field map 84 with the automated adjustments. Sequentially, the "Header Damage Prevention" algorithm 900 first updates the field map 84 with the automated contour adjustments, and then updates the field map 84 with the automated obstacle adjustments which can potentially overwrite the contour adjustments. This prioritizes the obstacle adjustments over the contour adjustments, which since impacts with obstacles can be more damaging than encountering the relatively more gradual changes in the contour of the ground surface. In other embodiments, priority may be given to other events, such as the changes in ground contour for each division Div.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances or resolutions associated with manufacturing, assembly, and use of the described embodiments and components.

What is claimed is:

1. A work machine comprising:
   a chassis;
   a work implement movably coupled to the chassis, the work implement configured to perform a field-engaging function;
   an actuator coupled to the work implement and configured to adjust a position of the work implement relative to a ground surface;
   a controller in communication with an output device and a communication module, the controller configured to
      monitor a location of the work machine via the communication module,
      load a field map from a field map database, the field map identifying at least one impact event comprising a geotagged location and a load acting on the actuator, and
      display an alert via the output device in response to (i) the location of the work machine approaching within a predetermined distance from the geotagged location, and (ii) the load acting on the actuator exceeding a predetermined value.

2. The work machine of claim 1, wherein the alert includes instructions to adjust the position of the work implement.

3. The work machine of claim 1, wherein the predetermined distance is a first predetermined distance, and the controller is further configured to stop displaying the alert via the output device in response to the location of the work machine moving beyond a second predetermined distance from the geotagged location.

4. A work machine comprising:
   a chassis;
   a work implement movably coupled to the chassis, the work implement configured to perform a field-engaging function;
   an actuator coupled to the work implement and configured to adjust a position of the work implement relative to a ground surface; and
   a controller in communication with a communication module, the controller configured to
      monitor a location of the work machine via the communication module,
      load a field map from a field map database, the field map identifying at least one impact event that comprises a geotagged location and a characteristic of the actuator associated with the geotagged location,
      determine whether the characteristic of the actuator exceeds a predetermined value, and
      in response to the characteristic of the actuator exceeding the predetermined value, create an adjustment event to adjust the position of the work implement via the actuator in response to the location of the work machine approaching within a predetermined distance from the geotagged location;

wherein the controller is further configured to:
compare the characteristic of the actuator to the predetermined value to determine a magnitude of the at least one impact event,
determine an adjustment ratio based on the magnitude of the at least one impact event, and
assign the adjustment ratio to the adjustment event.

5. The work machine of claim 4, wherein the characteristic is a load acting on the actuator.

6. The work machine of claim 4, wherein the adjustment event is a first adjustment event, the predetermined distance is a first predetermined distance, and the controller is further configured to create a second adjustment event to return the position of the work implement back to a mapped setting via the actuator in response to the location of the work machine moving beyond a second predetermined distance from the geotagged location.

7. The work machine of claim 4, wherein the controller is further configured to update the field map to include the adjustment event and upload the updated field map to the field map database.

8. The work machine of claim 4, wherein:
the adjustment ratio comprises a first adjustment ratio and a second adjustment ratio that is greater than the first adjustment ratio;
the controller is further configured to assign the first adjustment ratio to the adjustment event in response to operating in a first mode, and assign the second adjustment ratio to the adjustment event in response to operating in a second mode.

9. The work machine of claim 4, wherein the actuator comprises a tilt cylinder configured to adjust a tilt angle formed between a cutter bar of the work implement and the ground surface.

10. The work machine of claim 4, wherein the wherein the actuator comprises a hydraulic actuator, and the characteristic is a pressure of a hydraulic fluid acting within the hydraulic actuator.

11. The work machine of claim 4, wherein:
the characteristic is a first characteristic,
the predetermined value is a first predetermined value,
the adjustment event is a first adjustment event,
the field map further identifies spatial information about a corresponding field and a second characteristic of the actuator associated with the spatial information, and
the controller is further configured to
partition the spatial information into at least one pass traversable by the work machine in the field, and partition the at least one pass into at least one division,
determine whether the second characteristic of the actuator for the at least one division exceeds a second predetermined value, and
in response to the second characteristic of the actuator for the at least one division exceeding the second predetermined value, create a second adjustment event to adjust the position of the work implement via the actuator in response to the location of the work machine moving within the at least one division.

12. The work machine of claim 11, wherein the load is a first load, and the second characteristic is a second load acting on the actuator.

13. The work machine of claim 11, wherein the controller is further configured to determine whether the second characteristic of the actuator for the at least one division is less than the second predetermined value, and in response to the second characteristic of the actuator for the at least one division being less than the second predetermined value, maintain a mapped position of the work implement via the actuator in response the location of the work machine moving within the at least one division.

14. The work machine of claim 11, wherein the controller is further configured to update the field map to include the second adjustment event and upload the updated field map to the field map database.

15. The work machine of claim 11, wherein the actuator comprises a tilt cylinder configured to adjust a tilt angle formed between a cutter bar of the work implement and the ground surface.

16. The work machine of claim 11, wherein the actuator comprises a lift cylinder configured to adjust a height of the work implement measured relative to the ground surface.

17. The work machine of claim 11, wherein the actuator comprises a float cylinder configured to adjust a float pressure of the work implement.

18. The work machine of claim 11, wherein the actuator comprises a hydraulic actuator, and the second characteristic is a pressure of a hydraulic fluid acting within the hydraulic actuator.

19. A work machine comprising:
a chassis;
a work implement movably coupled to the chassis, the work implement configured to perform a field-engaging function;
an actuator coupled to the work implement and configured to adjust a position of the work implement relative to a ground surface; and
a controller in communication with a communication module, the controller configured to
monitor a location of the work machine via the communication module,
load a field map from a field map database, the field map identifying at least one impact event that comprises a geotagged location and a characteristic of the actuator associated with the geotagged location,
determine whether the characteristic of the actuator exceeds a predetermined value, and
in response to the characteristic of the actuator exceeding the predetermined value, create an adjustment event to adjust the position of the work implement via the actuator in response to the location of the work machine approaching within a predetermined distance from the geotagged location;
wherein:
the predetermined value comprises a first predetermined value and a second predetermined value that is greater than the first predetermined value;
the controller is further configured to utilize the first predetermined value in response to operating in a first mode, and utilize the second predetermined value in response to operating in a second mode.

* * * * *